(12) United States Patent
Hsiao (10) Patent No.: US 11,596,195 B2
(45) Date of Patent: Mar. 7, 2023

(54) METHOD FOR MAKING SOLE STRUCTURE WITH KNITTED FABRIC AND SOLE STRUCTURE

(71) Applicant: ZHONGSHAN YOURWAY FASHION TECHNOLOGY LTD., Zhongshan (CN)

(72) Inventor: Chin-Hsun Hsiao, Zhongshan (CN)

(73) Assignee: ZHONGSHAN YOURWAY FASHION TECHNOLOGY LTD., Zhongshan (CN)

( * ) Notice: Subject to any disclaimer, the term of this patent is extended or adjusted under 35 U.S.C. 154(b) by 29 days.

(21) Appl. No.: 17/093,156

(22) Filed: Nov. 9, 2020

(65) Prior Publication Data

US 2021/0145109 A1 May 20, 2021

(30) Foreign Application Priority Data

Nov. 18, 2019 (TW) .................................. 108141747

(51) Int. Cl.
*B29C 70/00* (2006.01)
*B29C 70/42* (2006.01)
*B29C 70/28* (2006.01)
*B29C 70/40* (2006.01)
*B29D 35/00* (2010.01)
*A43B 1/14* (2006.01)
*A43B 13/42* (2006.01)
(Continued)

(52) U.S. Cl.
CPC ................. *A43B 1/14* (2013.01); *A43B 1/04* (2013.01); *A43B 13/181* (2013.01); *A43B 13/187* (2013.01); *A43B 13/42* (2013.01); *A43D 35/00* (2013.01); *B29C 70/003* (2021.05); *B29C 70/28* (2013.01); *B29C 70/40* (2013.01); *B29C 70/42* (2013.01); *B29D 35/0018* (2013.01); *B29D 35/0054* (2013.01); *B29D 35/122* (2013.01); *B29D 35/142* (2013.01)

(58) Field of Classification Search
CPC ...................................................... A43B 1/04
See application file for complete search history.

(56) References Cited

U.S. PATENT DOCUMENTS

9,775,401 B2 10/2017 Cross et al.
9,848,673 B2 12/2017 Cross
(Continued)

*Primary Examiner* — Xiao S Zhao
*Assistant Examiner* — John J DeRusso
(74) *Attorney, Agent, or Firm* — Muncy, Geissler, Olds & Lowe, P.C.

(57) ABSTRACT

The present invention provides a method for making a sole structure with a knitted fabric and a sole structure. The method comprises steps of: placing a thermoplastic filling material in a knitted fabric, sealing an opening of the knitted fabric, placing the knitted fabric with the opening sealed in a mold, applying a heating temperature to melt the thermoplastic filling material of the knitted fabric, and restricting a shape of the knitted fabric via the mold to make a sole structure. The sole structure includes a compressible elastomer and a knitting texture wrapped around the compressible elastomer and fused with a surface of the compressible elastomer. The compressible elastomer is formed from the thermoplastic filling material after being melted and cooled. The knitting texture is formed from the knitted fabric and is capable of being directly observed from an appearance of the sole structure.

13 Claims, 13 Drawing Sheets

(51) Int. Cl.
*A43D 35/00* (2006.01)
*B29D 35/14* (2010.01)
*B29D 35/12* (2010.01)
*A43B 13/18* (2006.01)
*A43B 1/04* (2022.01)

(56) References Cited

U.S. PATENT DOCUMENTS

| | | |
|---|---|---|
| 9,950,486 B2 | 4/2018 | Hartmann |
| 10,051,915 B2 | 8/2018 | Otsuka et al. |
| 10,166,734 B2 | 1/2019 | Baggen |
| 10,172,415 B2 | 1/2019 | Wan et al. |
| 10,238,172 B2 | 3/2019 | Grondin |
| 2018/0332920 A1* | 11/2018 | Burch ................ A43B 23/0215 |

* cited by examiner

METHOD FOR MAKING SOLE STRUCTURE WITH KNITTED FABRIC AND SOLE STRUCTURE

FIELD OF THE INVENTION

The invention relates to a method for making a sole structure, and more particularly to a method for making a sole structure with a knitted fabric and a sole structure.

BACKGROUND OF THE INVENTION

A shoe is nothing more than composing of an upper and a sole combined with the upper. For the upper, it was formed by splicing multiple sheets of material in the early days. However, some manufacturers have introduced a technical solution to make the upper with knitted fabric, so that the upper is no longer restricted by the material of the sheets, and complex color patterns can be realized by the knitted fabric.

However, for the sole, a compressible elastomer is still commonly used as the main implementation. As disclosed in U.S. Pat. Nos. 9,950,486, 10,051,915, and 10,238,172, the compressible elastomer is generally made to have only a single color or monotonous pattern change. In addition, although some manufacturers have introduced a technical solution for forming the sole with a plurality of compressible elastomers, as disclosed in U.S. Pat. Nos. 10,172,415 and 10,166,734, the sole presents color changing with a sense of design by making the compressible elastomers with different colors, but this implementation can still only present visual experience of large-scale color block changes, and cannot present a more unique visual experience or patterns with fine changes.

In addition, U.S. Pat. No. 9,848,673 discloses an implementation different from the above-mentioned techniques. In the process of forming the upper, an insert element 300 (FIG. II of U.S. Pat. No. 9,848,673) is added, and a knitted jacket is placed on the insert element and a mold of the upper to form the integral upper and sole, and then a shoe cover element 1800 (FIG. 18 of U.S. Pat. No. 9,848,673) or an outsole covering component 2400 (FIG. 24 of U.S. Pat. No. 9,848,673) is correspondingly disposed. However, although this implementation allows the shoe to present a visual experience of fine changes as a whole through the knitted fabric, the shoe is not visually pleasing or attractive and is monotonous. Since the upper and the sole are made of a single knitted fabric, if a user wears the shoe to do vigorous exercise, the knitted fabric corresponding to the upper will pull the knitted fabric corresponding to the sole, causing the knitted fabric corresponding to the sole to detach from the insert element easily, which can easily cause damage to the shoe.

In addition, the U.S. Pat. No. 9,775,401 discloses that the sole includes a one-piece woven outsole formed by the knitted fabric 112 (FIG. 24 of U.S. Pat. No. 9,775,401). The embodiments disclosed in FIGS. 13-24 and the corresponding paragraphs of the patent U.S. Pat. No. 9,775,401 show that when the one-piece woven outsole is developed, the knitted fabric is first placed in a mold, the knitted fabric is then pressed to form a plurality of concave parts. During pressing the knitted fabric to form the concave parts, a material is injected into each of the concave parts to form a protrusion. However, it can be known from the foregoing that the one-piece knitted outsole described in the embodiments does not have the compressible elastomer as a buffer, which can only be used as one of the components for composing the sole, commonly known as an outsole in the industry, but fail to be qualified as the sole referred in the present invention.

SUMMARY OF THE INVENTION

A main object of the invention is to solve the problem that the existing methods are incapable of making a sole structure with a compressible elastomer by using a knitted fabric.

In order to achieve the above object, the invention provides a method for making a sole structure with a knitted fabric, the method comprises steps of:

placing a thermoplastic filling material in the knitted fabric, wherein the knitted fabric comprises a space for the thermoplastic filling material to be placed in and an opening communicating with the space;

sealing the opening; and placing the knitted fabric with the opening sealed into a mold, applying a heating temperature to melt the thermoplastic filling material of the knitted fabric, and restricting a shape of the knitted fabric via the mold to make the sole structure, wherein the sole structure includes a compressible elastomer and a knitting texture wrapped around the compressible elastomer and fused with a surface of the compressible elastomer, the compressible elastomer is formed from the thermoplastic filling material after being melted and cooled, the knitting texture is formed from the knitted fabric and is directly observed from an appearance of the sole structure.

In one embodiment, the mold includes at least one first mold to define a size of the sole structure, and a second mold matching with the first mold to form a side of the sole structure which is assembled with a shoe upper.

In one embodiment, a side of the second mold facing the knitted fabric comprises a continuous curved surface that simulates shape of a sole of a human foot.

In one embodiment, the second mold is a shoe last. In one embodiment, the method further includes: performing a trimming operation to the sole structure.

In one embodiment, the method further includes: defining the sole structure as a midsole, and sticking an outsole under the sole structure.

In one embodiment, the method further includes: placing a thermoplastic material in the mold while the knitted fabric is placed in the mold, wherein the thermoplastic material directly fuses with the sole structure and forms as the outsole when the sole structure is manufactured.

In one embodiment, the thermoplastic material and the thermoplastic filling material are a plurality of thermoplastic polyurethane (TPU) expanded particles, and the thermoplastic material and the thermoplastic filling material are melted by a microwave heating method.

In one embodiment, the knitted fabric comprises a plurality of yarn loops, and the plurality of yarn loops is knitted by at least one yarn and at least one hot melt yarn.

In addition to the aforementioned method, the invention also provides a sole structure, which is made with a knitted fabric, takes a compressible elastomer as a base. The sole structure comprises a knitting texture fused with a surface of the compressible elastomer to wrap around the compressible elastomer while the compressible elastomer is formed, wherein the knitting texture comprises a plurality of yarn loops.

In one embodiment, the sole structure comprises an outsole provided on one side of the sole structure.

In one embodiment, the compressible elastomer and the outsole are respectively formed from a plurality of thermoplastic polyurethane expanded particles after heated by a microwave heating method.

According to the foregoing description, compared with the prior art, the invention has the following features: the sole structure of the invention is an independent part of shoemaking, and the knitting texture located on a surface of the sole structure can also be made of yarns with different colors and be designed with a variety of patterns, so that design ideas of a shoe designer are no longer restricted by the conventional structure. Furthermore, the knitting texture on the surface of the sole structure of the invention can not only provide different colors or patterns of an appearance of the sole for consumers to choose, but also strengthen a structural strength of the compressible elastomer and reduce an incidence of damages of the compressible elastomer.

DETAILED DESCRIPTION OF THE PREFERRED EMBODIMENTS

The detailed description and technical content of the invention are described below with reference to the drawings.

Figure 1:
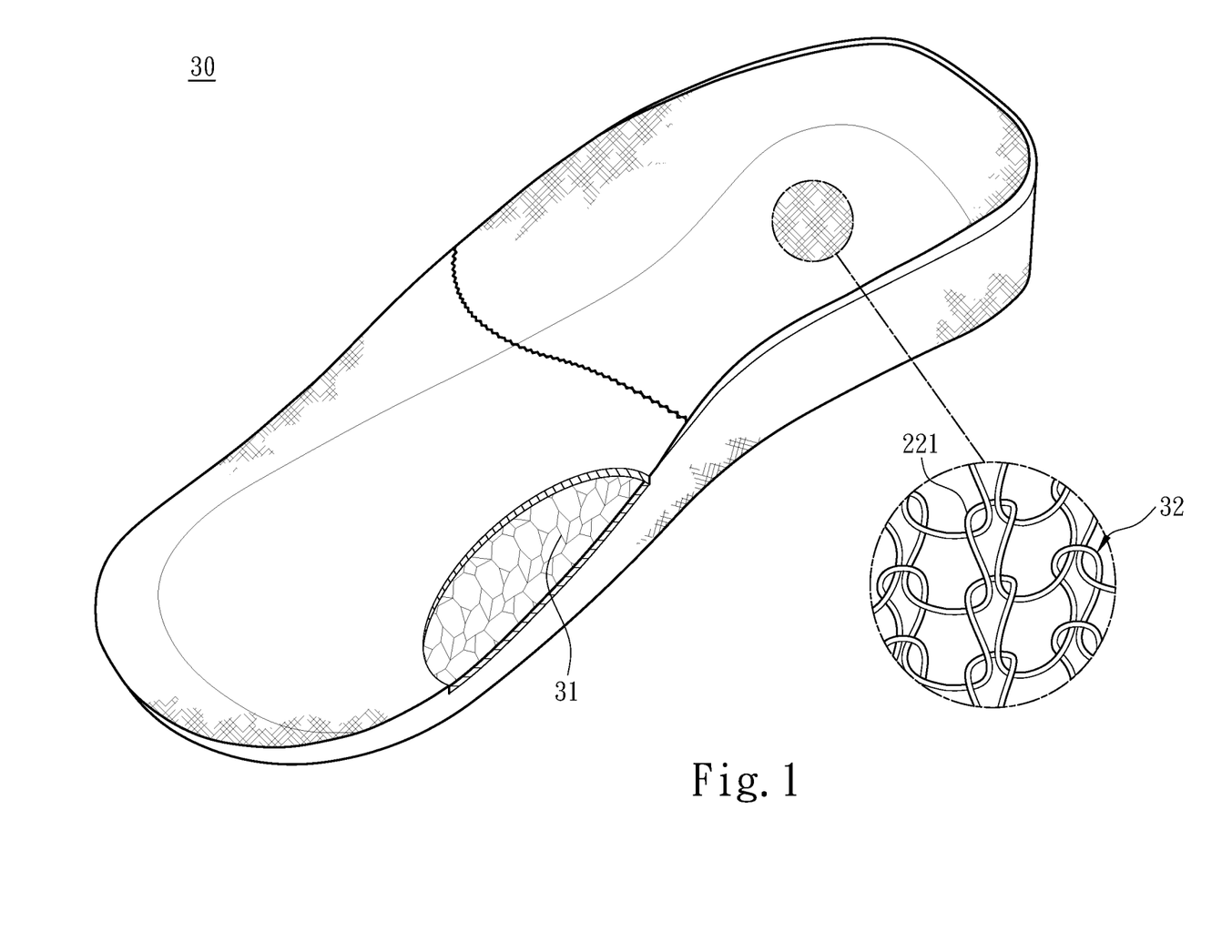
FIG. 1 is a schematic structural diagram of a sole structure of a first embodiment of the invention.
Figure 2:
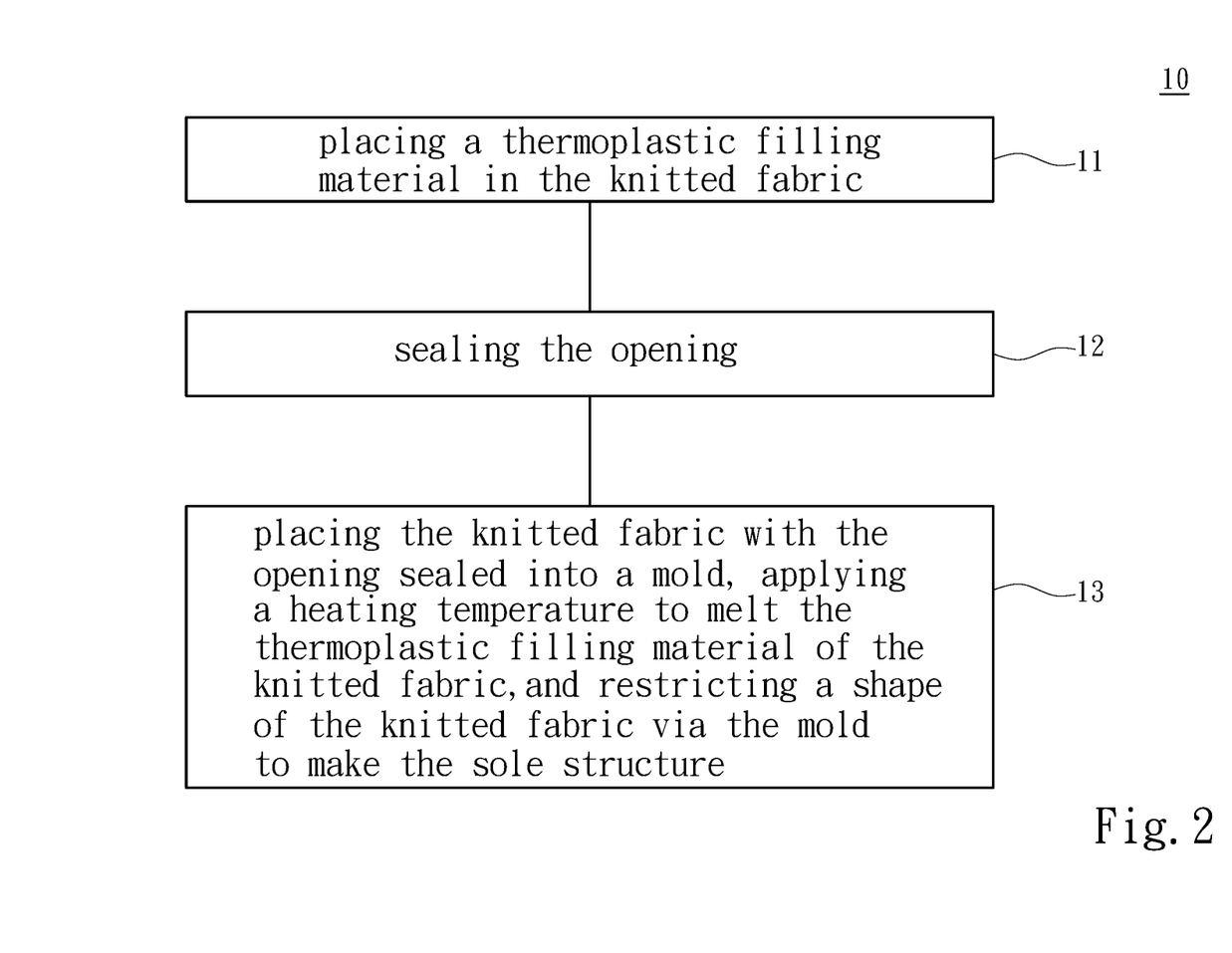
FIG. 2 is a flowchart of a method of the first embodiment of the invention.
Figure 3:
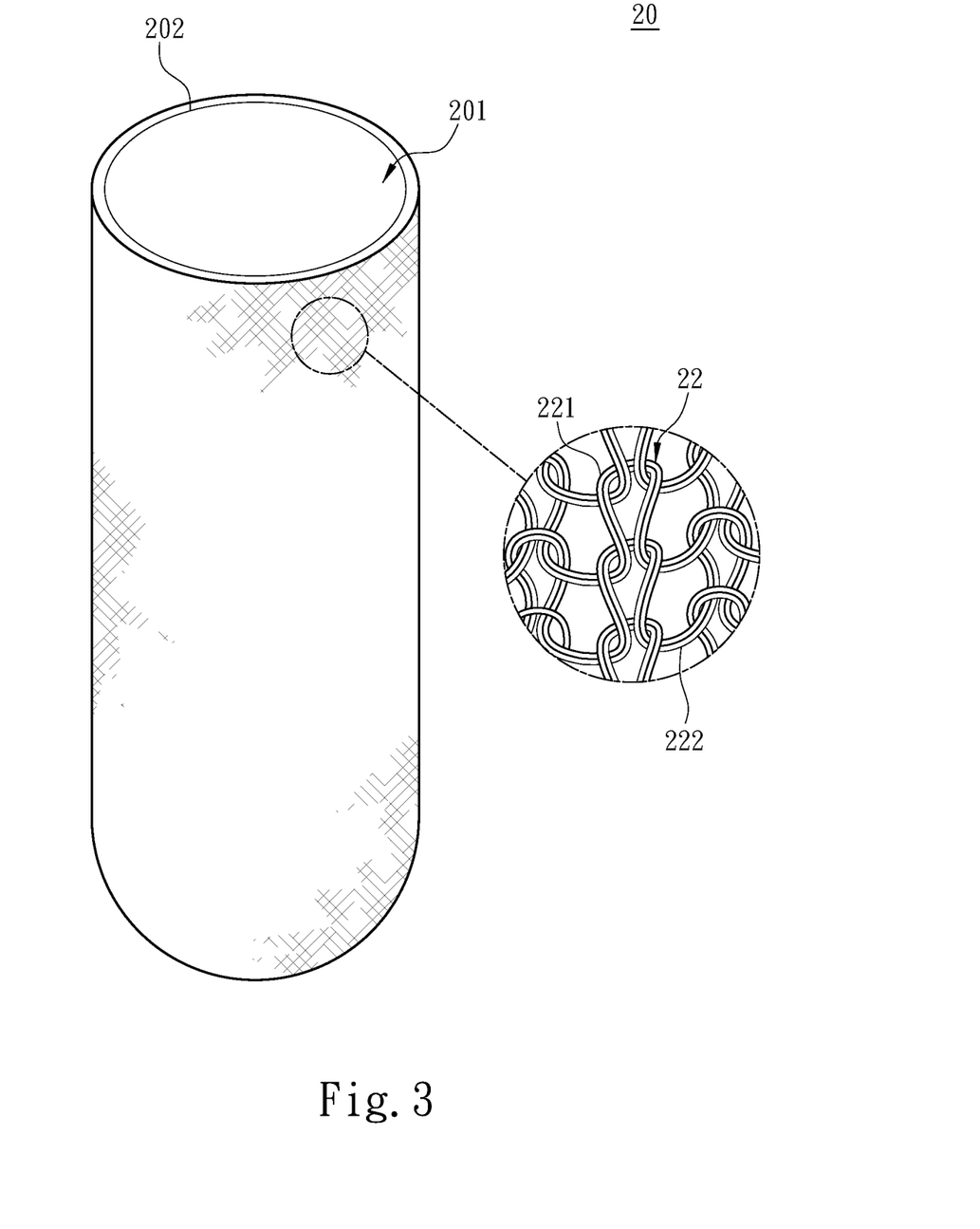
FIG. 3 is a first schematic diagram of implementation of the first embodiment of the invention.
Figure 6:
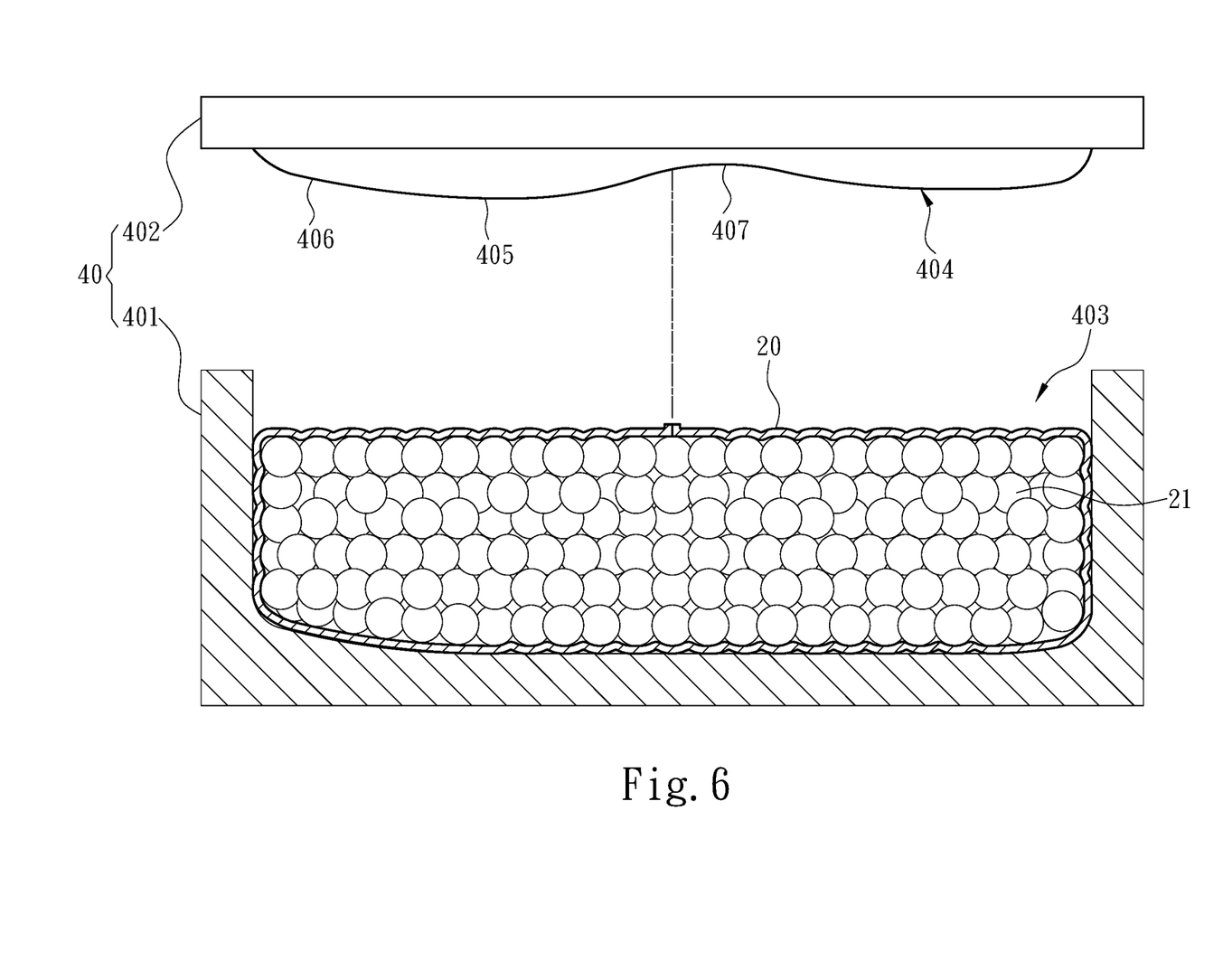
FIG. 6 is a fourth schematic diagram of implementation of the first embodiment of the invention.

Please refer to FIG. 1, FIG. 2, and FIG. 3, the invention provides a method 10 for making a sole structure with a knitted fabric. A knitted fabric 20 referred to herein is formed with a space 201 and an opening 202 communicating with the space 201. Further, the knitted fabric 20 can be implemented by a sock blank (as shown in FIG. 3), a fabric knitted by a bag knitting technique, or a fabric stitched with a plurality of cloth materials. In addition, the knitted fabric 20 of the invention is not used as a basis for forming a sole structure 30, and a basis of the sole structure 30 is realized with a compressible elastomer 31. Further, the method. 10 includes the following steps of:

step 11: placing a thermoplastic filling material 21 in the space 201 of the knitted fabric 20;

step 12: sealing the opening 202; and step 13: placing the knitted fabric 20 with the opening 202 sealed into a mold 40 (as shown in FIG. 6), applying a heating temperature to melt the thermoplastic filling material 21 of the knitted fabric 20, and restricting a shape of the knitted fabric 20 via the mold 40 to make the sole structure 30.

Figure 4:
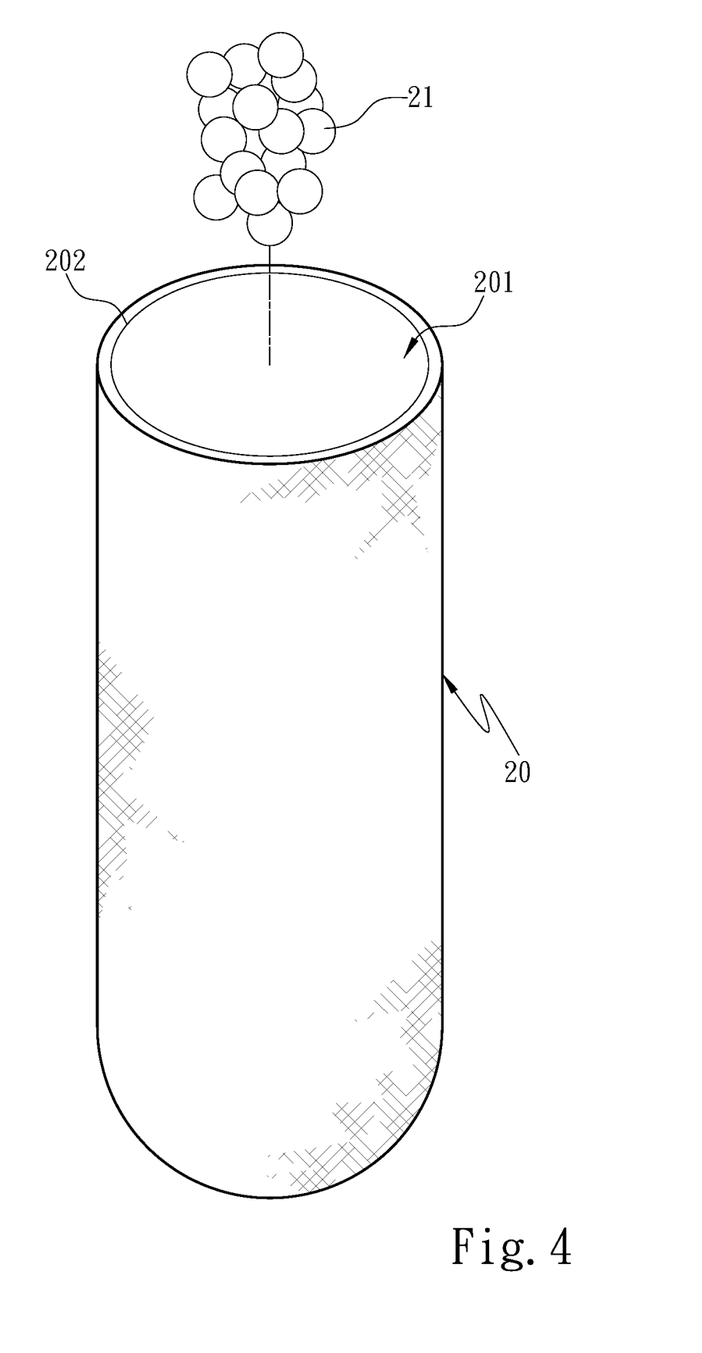
FIG. 4 is a second schematic diagram of implementation of the first embodiment of the invention.
Figure 5:
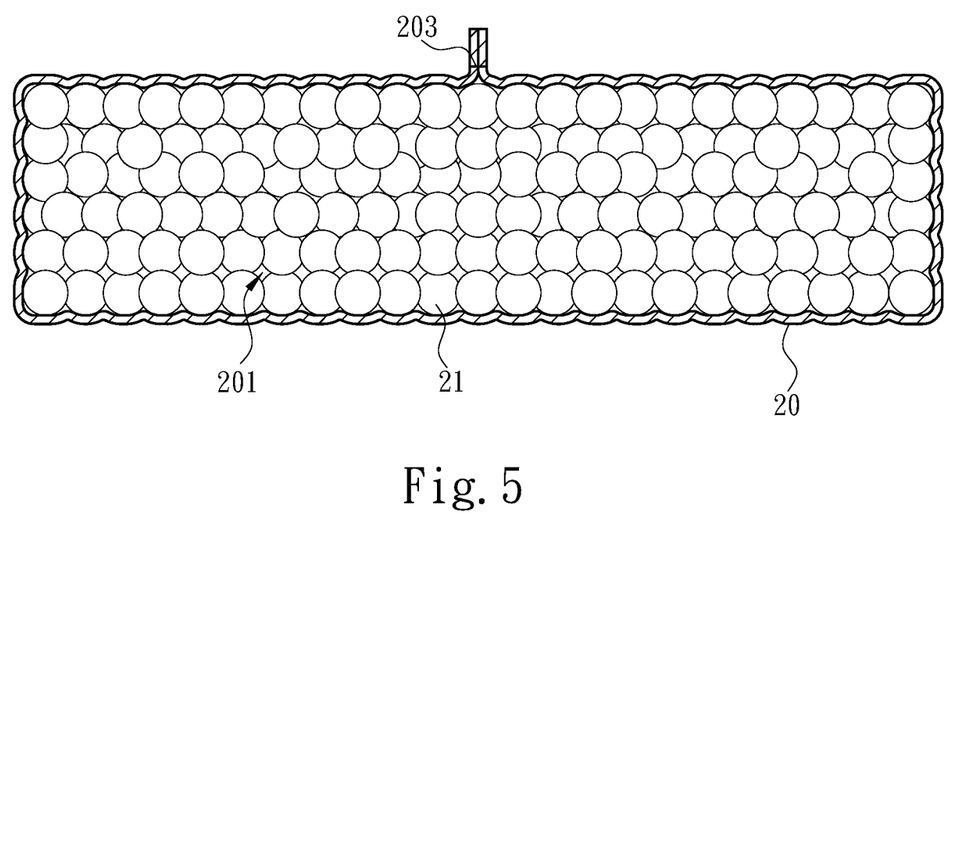
FIG. 5 is a third schematic diagram of implementation of the first embodiment of the invention.
Figure 7:
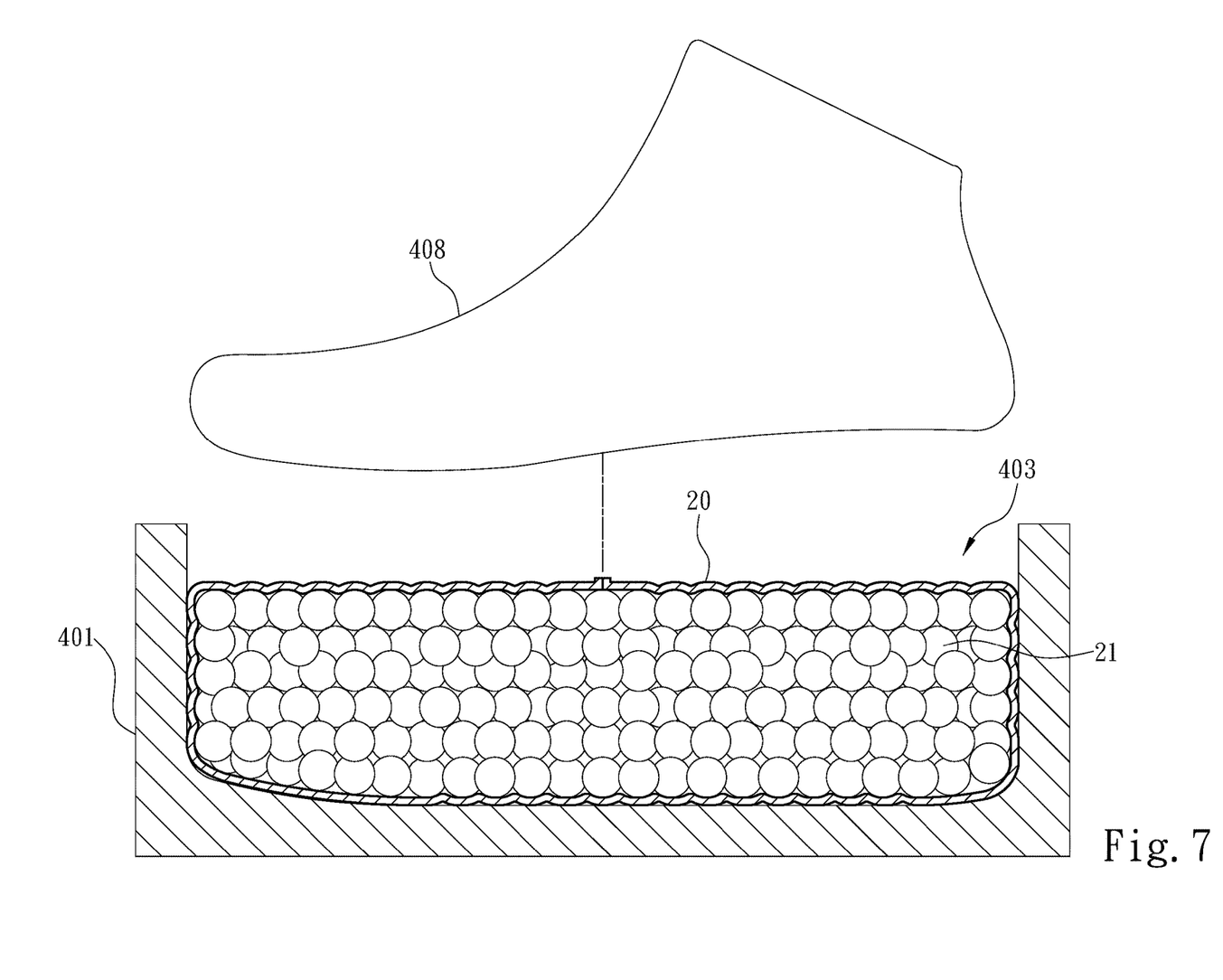
FIG. 7 is a schematic diagram of implementation of a second embodiment of the invention.

At the beginning of implementation, the knitted fabric 20 and the thermoplastic filling material 21 are prepared. In one embodiment, the thermoplastic filling material 21 is a plurality of thermoplastic polyurethane (TPU) expanded particles. Please refer to FIG. 4, the thermoplastic filling material 21 is placed in the space 201, and the amount of the thermoplastic filling material 21 filled into the space 201 can be determined according to requirements, and is not limited to be fully filled the space 201. Thereafter, the opening 202 of the knitted fabric 20 is sealed at a sealing position 203 (shown in FIG. 5) by a processing method such as sewing or hot pressing, so that the thermoplastic filling material 21 is confined in the space 201. Please also refer to FIG. 6. Then, the knitted fabric 20 manufactured by the aforementioned operations is placed in the mold 40. In one embodiment, the mold 40 includes a first mold 401 and a second mold 402 matching with the first mold 401. The first mold 401 can be a single mold base or a plurality of sub-mold bases. However, regardless of structures of the first mold 401, the first mold 401 is formed with a mold cavity 403. A size of the mold cavity 403 determines a size of the sole structure 30, that is, the mold cavity 403 is provided for the knitted fabric 20 which is filled and sealed to be placed therein. In general, the sole structure 30 is not only formed in a single size for shoemaking; in other words, it needs to develop multiple sizes in response to market demands. Therefore, the first mold 401 is selected according to the size of the sole structure 30 to be made. In addition, the second mold 402 is used to form a side of the sole structure 30 for assembling with a shoe upper (not shown in the figures), wherein the shoe upper is ordinary skills in the art and will not be repeated here. The second mold 402 is formed with a continuous curved surface 404 thereon that simulates shape of a sole of a human foot. Further, viewed from a side of the continuous curved surface 404, a lowest point 405 is defined, and based on the lowest point 405, a forefoot curved surface 406 extends in one direction, and a hindfoot curved surface 407 extends toward an opposite direction of the forefoot curved surface 406. The forefoot curved surface 406 and the hindfoot curved surface 407 have different shapes. Furthermore, after the first mold 401 and the second mold 402 are disposed correspondingly, the continuous curved surface 404 faces the mold cavity 403 and contacts the knitted fabric 20 placed in the mold cavity 403 to limit shape of the knitted fabric 20 on one side. Specifically, the first mold 401 presses the knitted fabric 20 to form a side of the sole structure 30 facing a sole of a human foot. In addition, in one embodiment, the second mold 402 is directly implemented as a shoe last 408, and the continuous curved surface 404 is a bottom surface of the shoe last 408, as shown in FIG. 7.

After the mold 40 is prepared, the knitted fabric 20 is heated and pressed by the mold 40. The mold 40 is controlled to apply a heating temperature to the knitted fabric 20, wherein the heating temperature is sufficient to cause the thermoplastic filling material 21 to melt. In one embodiment, the mold 40 is implemented by microwave heating. In addition, when the thermoplastic filling material 21 is melted, the knitted fabric 20 will be bonded to the thermoplastic filling material 21. After the mold 40 is demolded and cooled, the sole structure 30 of the invention is formed. Further, the thermoplastic filling material 21 is fused to become the compressible elastomer 31 after being melted and cooled, and texture on the knitted fabric 20 is fused with the thermoplastic filling material 21 when the thermoplastic filling material 21 is melted. That is, after the method of the invention is completed, the sole structure 30 comprises a knitting texture 32 wrapped around the compressible elastomer 31 and fused with a surface of the compressible elastomer 31. The knitting texture 32 comprises a plurality of yarn loops 22 which is an ordinary skill in the field of knitting technique and will not be described herein. The plurality of yarn loops 22 is formed as the structure of the knitted fabric 20. Furthermore, the knitting texture 32 of the invention can be directly observed from an appearance of the sole structure 30, that is, the sole structure 30 as a whole is rendered with colors by the knitting texture 32. For example, if the knitted fabric 20 with camouflage patterns is used for manufacturing the sole structure 30, an appearance of the sole structure 30 will be camouflage patterns. In this way, the sole structure 30 of the invention is not limited to a color of the compressible elastomer 31, but can exhibit a variety of colors and patterns by the knitting texture 32. In addition, the knitting texture 32 increases the structural strength of the compressible elastomer 31 and reduces a possibility of damage to the compressible elastomer 31 due to multiple deformations and other factors since the knitting texture 32 is wrapped around the compressible elastomer 31 and fused with the surface of the compressible elastomer 31.

It can be known from the foregoing that the knitted fabric 20 of the invention is composed of the plurality of yarn loops 22, wherein the plurality of yarn loops 22 can be knitted by a single yarn 221 or a plurality of the yarns 221. In one embodiment, the plurality of yarn loops 22 is knitted by at least one yarn 221 and at least one hot melt yarn 222, as shown in FIG. 3. Accordingly, at the same time that the thermoplastic filling material 21 is melted, the hot melt yarn 222 is also melted and fused with the thermoplastic filling material 21. After the sole structure 30 is made, only the yarn loops 22 formed by the yarns 221 can be seen in the knitting texture 32. In addition, there are many implementations of the hot melt yarn 222 referred to herein. In one embodiment, the hot melt yarn 222 is made of a thermofusible material. In another embodiment, the hot melt yarn 222 is composed of a basis yarn and a hot melt layer wrapped around the basis yarn.

Figure 8:
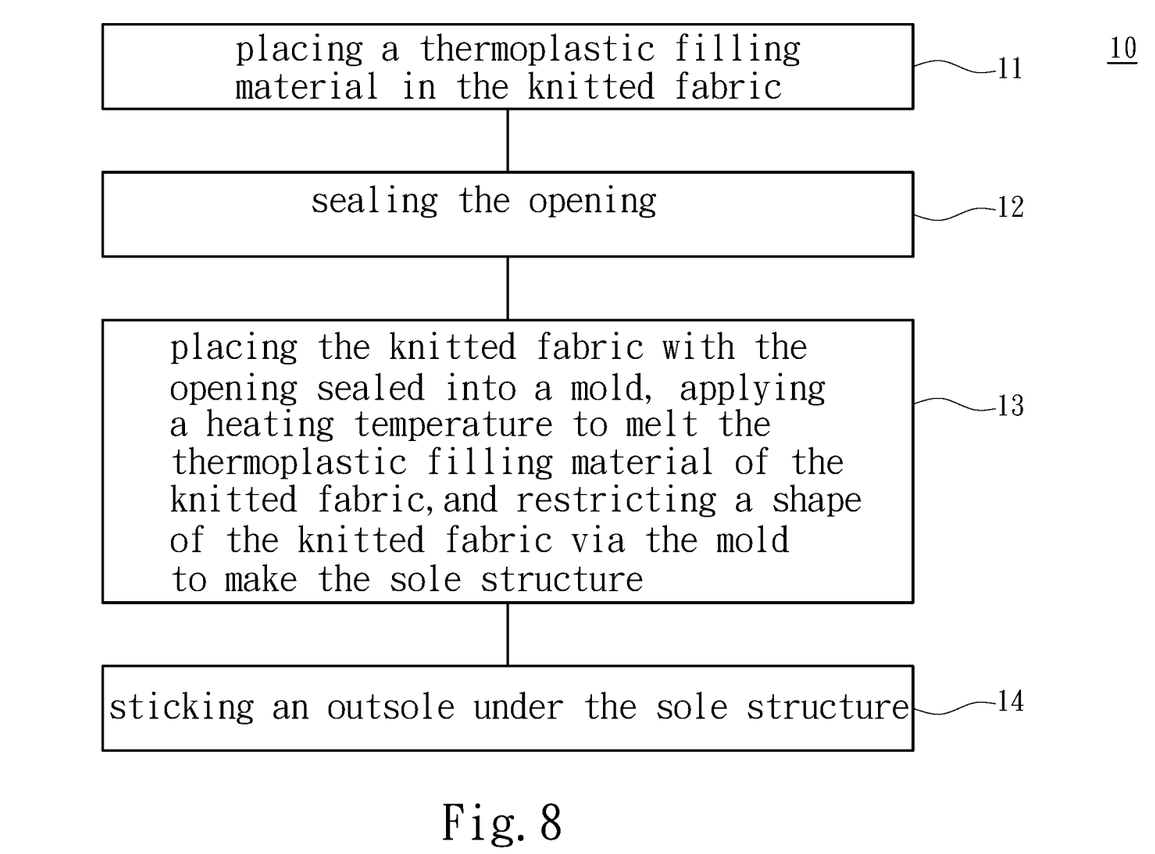
FIG. 8 is a flowchart of the method of a third embodiment of the invention.
Figure 9:
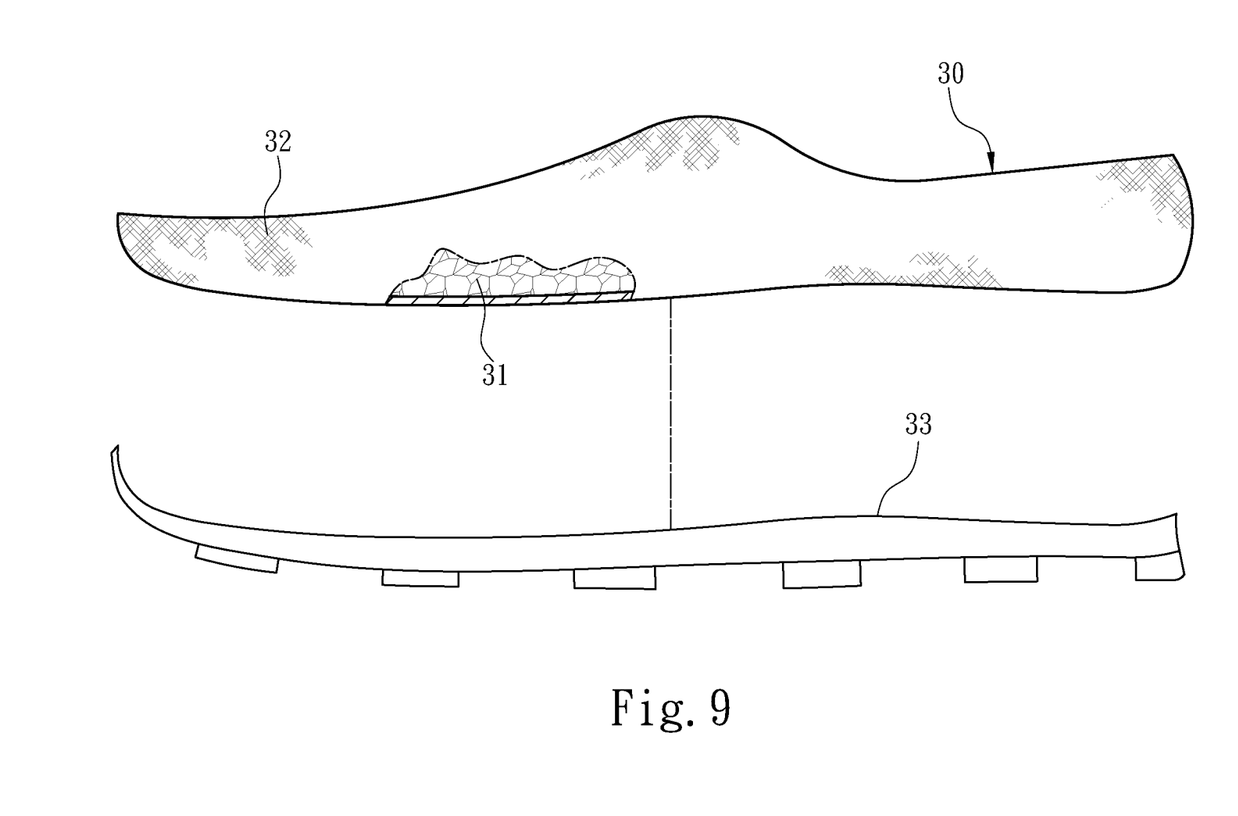
FIG. 9 is a schematic, diagram of implementation of the third embodiment of the invention.
Figure 10:
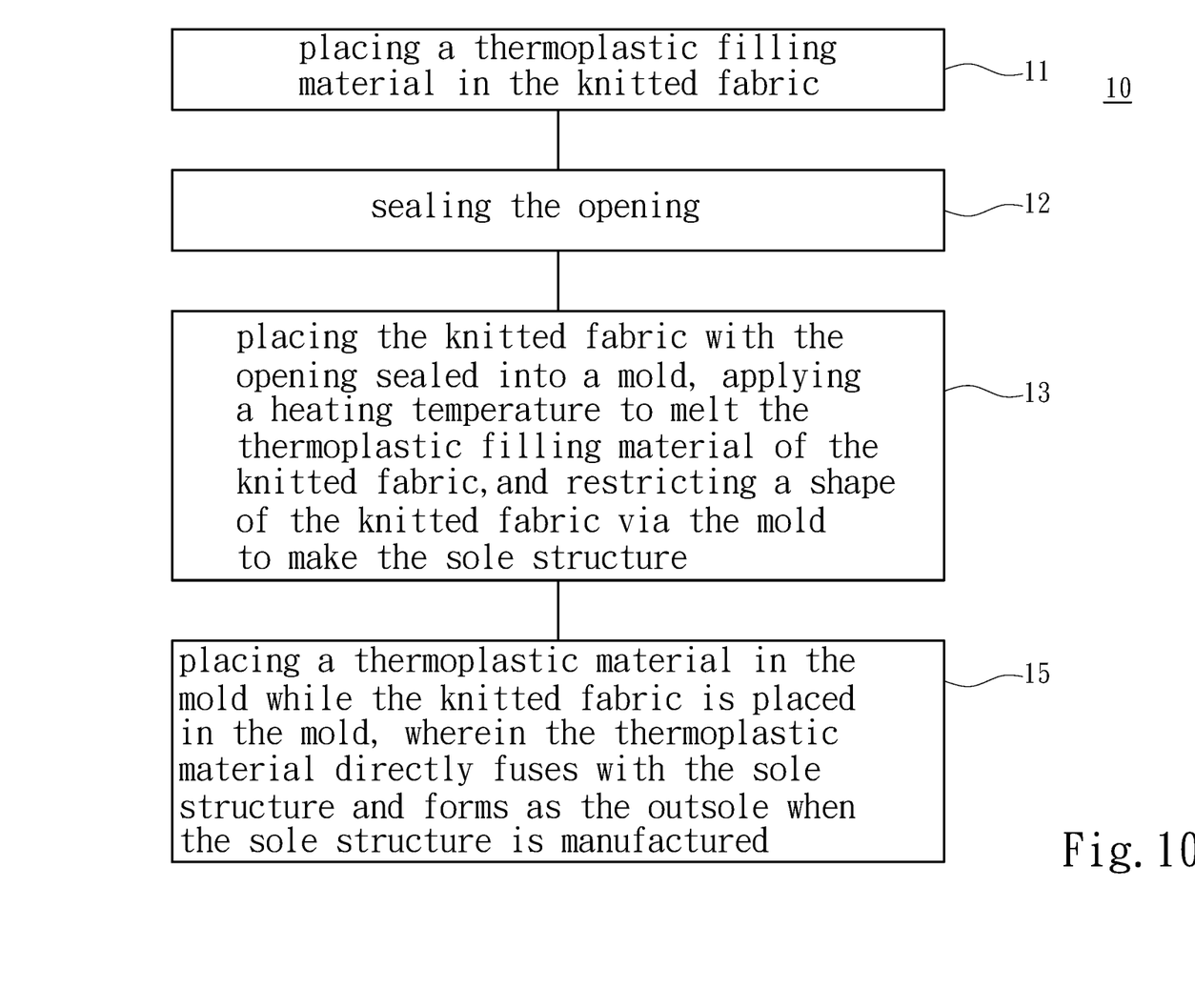
FIG. 10 is a flowchart of the method of a fourth embodiment of the invention.
Figure 11:
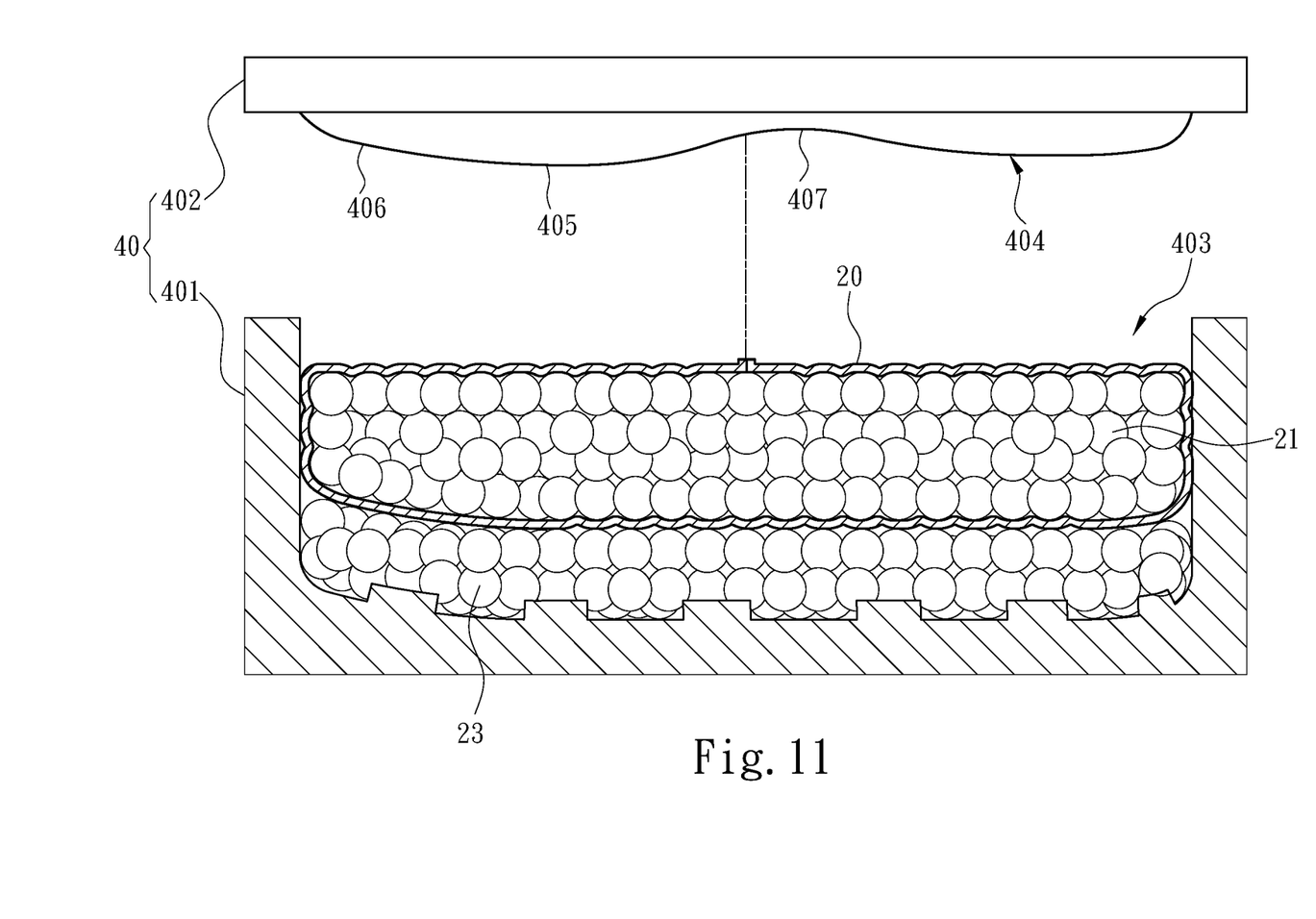
FIG. 11 is a schematic diagram of implementation of the fourth embodiment of the invention.

Please refer to FIG. 8 and FIG. 9, in one embodiment, the sole structure 30 is a structure with an outsole 33 and a midsole; but in other embodiments, the sole structure 30 is limited to with a midsole only. Namely, if the sole structure 30 only with a midsole is manufactured, the sole structure 30 needs to be assembled with the outsole 33 through an additional processing. In one embodiment, the method 10 further includes step 14: sticking the outsole 33 under the sole structure 30. In another embodiment, the outsole 33 is formed during the process of preparing the sole structure 30. Please refer to FIG. 10 and FIG. 11, the method 10 further includes step 15: placing a thermoplastic material 23 in the mold 40 while the knitted fabric 20 is placed in the mold 40, wherein the thermoplastic material 23 directly fuses with the sole structure 30 and forms as the outsole 33 when the sole structure 30 is manufactured. A timing of placing the thermoplastic material 23 depends on different designs of the mold 40, that is, a placement order can be adjusted as follow: placing the thermoplastic material 23 first and then placing the knitted fabric 20; or placing the knitted fabric 20 first and then placing the thermoplastic material 23. In one embodiment, the thermoplastic material 23 is a plurality of thermoplastic polyurethane expanded particles. Therefore, when the mold 40 is heated and presses the knitted fabric 20, the thermoplastic material 23 is melted simultaneously and fused with one side of the knitted fabric 20. After the mold 40 is demolded and cooled, the sole structure 30 including the outsole 33 is formed. In one embodiment, the thermoplastic material 23 is melted by microwave heating.

Figure 12:
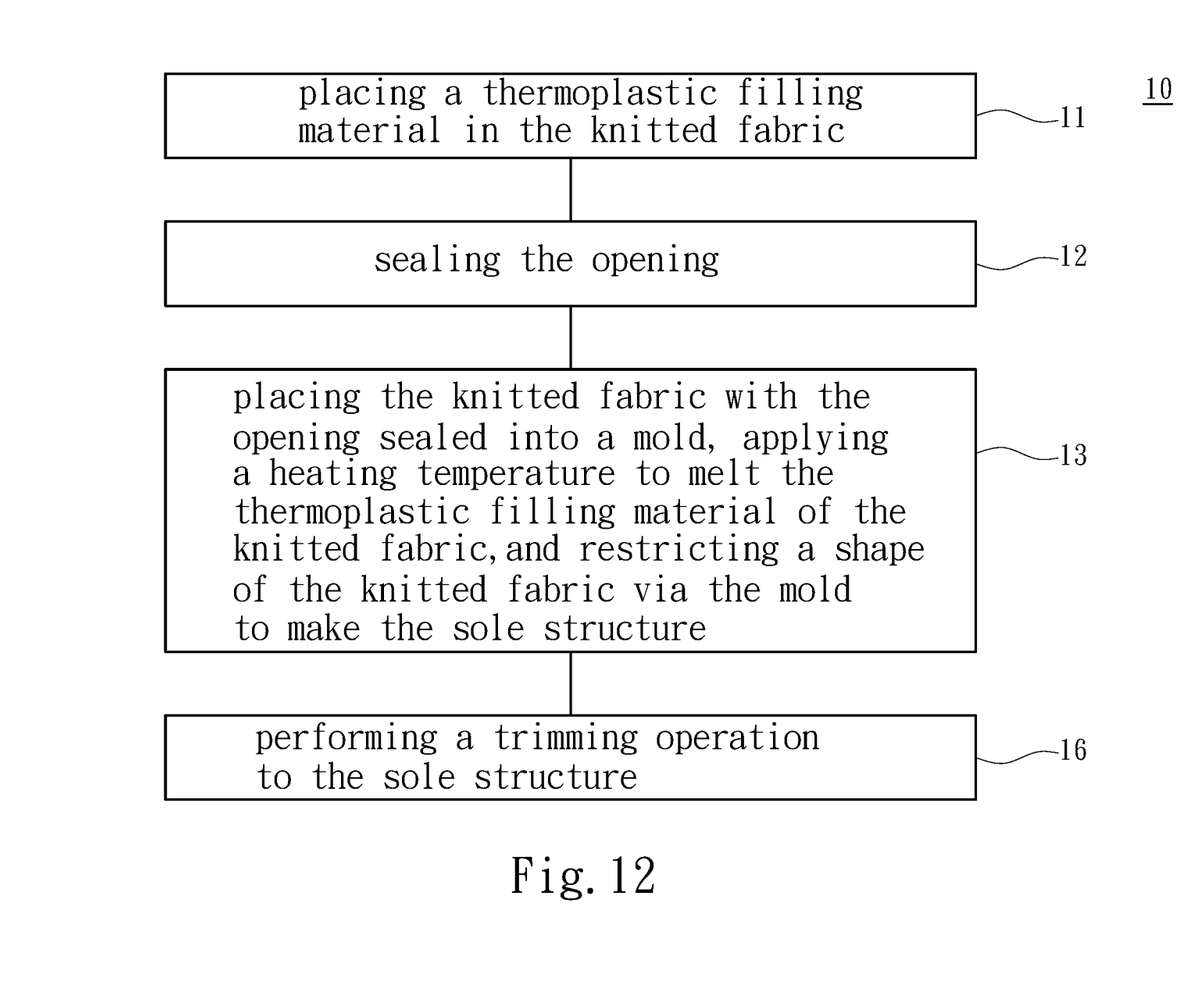
FIG. 12 is a flowchart of implementation of a fifth embodiment of the invention.
Figure 13:
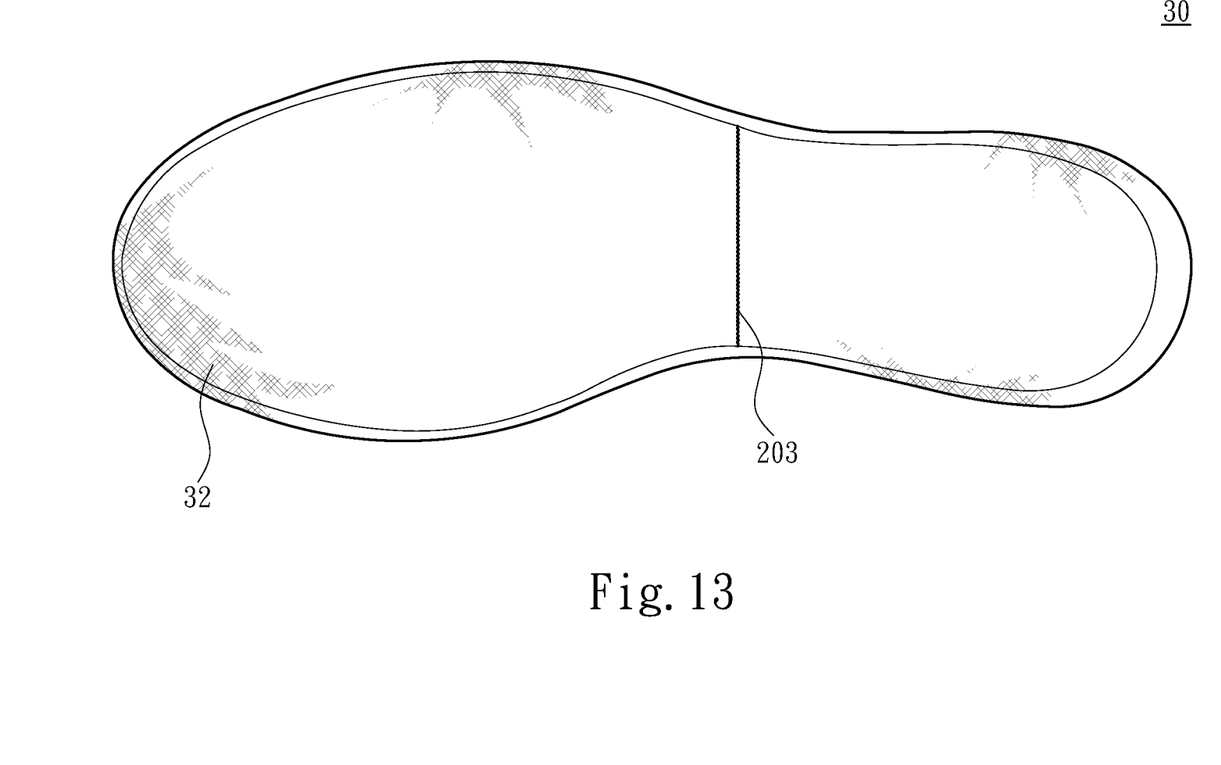
FIG. 13 is a top view of the sole structure of a sixth embodiment of the invention.

Please refer to FIG. 12. In one embodiment, after the sole structure 30 is manufactured, the method 10 further comprises step 16: performing a trimming operation to the sole structure 30. The trimming operation is implemented by automated machinery or manually. An object of the trimming operation is to trim edges of the knitted fabric 20 remaining after sealing. On the other hand, a position of the sealing position 203 can be adjusted while sealing the opening 202, In order to avoid damaging an appearance of the sole structure 30, the sealing position 203 is adjusted to be located at a side of the knitted fabric 20 which is intended to be assembled with an upper (not shown in the figure). In one embodiment, the sealing position 203 is located at a middle section of the sole structure 30, as shown in FIG. 13. Thereby, a complexity of the trimming operation is simplified.

What is claimed is:

1. A method for making a sole structure with a knitted fabric, comprising steps of:
    placing a thermoplastic filling material in the knitted fabric, wherein the knitted fabric comprises a space for the thermoplastic filling material to be placed in and an opening communicating with the space;
    sealing the opening; and
    placing the knitted fabric with the opening sealed into a mold, applying a heating temperature to melt the thermoplastic filling material of the knitted fabric, and restricting a shape of the knitted fabric via the mold to make the sole structure, wherein the sole structure includes a compressible elastomer and a knitting texture wrapped around the compressible elastomer and fused with a surface of the compressible elastomer, the compressible elastomer is formed from the thermoplastic filling material after being melted and cooled, the knitting texture is formed from the knitted fabric and is directly observed from an appearance of the sole structure.

2. The method for making the sole structure with the knitted fabric as claimed in claim 1, wherein the mold includes at least one first mold to define a size of the sole structure, and a second mold matching with the first mold to form a side of the sole structure which is assembled with a shoe upper.

3. The method for making the sole structure with the knitted fabric as claimed in claim 2, wherein a side of the second mold facing the knitted fabric comprises a continuous curved surface that simulates a shape of a sole of a human foot.

4. The method for making the sole structure with the knitted fabric as claimed in claim 2, wherein the second mold is a shoe last.

5. The method for making the sole structure with the knitted fabric as claimed in claim 1, wherein after the sole structure is manufactured, the method further includes: performing a trimming operation to the sole structure.

6. The method for making the sole structure with the knitted fabric as claimed in claim 5, wherein the method further includes: defining the sole structure as a midsole, and sticking an outsole under the sole structure.

7. The method for making the sole structure with the knitted fabric as claimed in claim 5, wherein the method further includes: placing a thermoplastic outsole material in the mold while the knitted fabric is placed in the mold, wherein the thermoplastic outsole material directly fuses with the sole structure and forms as an outsole when the sole structure is manufactured.

8. The method for making the sole structure with the knitted fabric as claimed in claim 7, wherein the thermoplastic outsole material and the thermoplastic filling material are a plurality of thermoplastic polyurethane (TPU) expanded particles, and the thermoplastic outsole material and the thermoplastic filling material are melted by a microwave heating method.

9. The method for making the sole structure with the knitted fabric as claimed in claim 1, wherein the method further includes: defining the sole structure as a midsole, and sticking an outsole under the sole structure.

10. The method for making the sole structure with the knitted fabric as claimed in claim 1, wherein the method further includes: placing a thermoplastic outsole material in the mold while the knitted fabric is placed in the mold, and forming an outsole, which directly fuses with the sole structure when the sole structure is manufactured, from the thermoplastic outsole material.

11. The method for making the sole structure with the knitted fabric as claimed in claim 10, wherein the thermoplastic outsole material is a plurality of thermoplastic polyurethane (TPU) expanded particles.

12. The method for making the sole structure with the knitted fabric as claimed in claim 1, wherein the thermoplastic filling material is a plurality of thermoplastic polyurethane (TPU) expanded particles, and the thermoplastic filling material is melted by a microwave heating method.

13. The method for making the sole structure with the knitted fabric as claimed in claim 1, wherein the knitted fabric comprises a plurality of yarn loops, and the plurality of yarn loops is knitted by at least one yarn and at least one hot melt yarn.

* * * * *